(12) United States Patent
Kerolos

(10) Patent No.: US 12,593,758 B2
(45) Date of Patent: Apr. 7, 2026

(54) VERTICAL GROWING SYSTEM

(71) Applicant: Maged Kerolos, Camarillo, CA (US)

(72) Inventor: Maged Kerolos, Camarillo, CA (US)

( * ) Notice: Subject to any disclaimer, the term of this patent is extended or adjusted under 35 U.S.C. 154(b) by 201 days.

(21) Appl. No.: 18/890,642

(22) Filed: Sep. 19, 2024

(65) Prior Publication Data

US 2025/0098596 A1     Mar. 27, 2025

Related U.S. Application Data

(60) Provisional application No. 63/540,445, filed on Sep. 26, 2023.

(51) Int. Cl.
| | |
|---|---|
| *A01G 9/02* | (2018.01) |
| *A01G 7/04* | (2006.01) |
| *A01G 9/24* | (2006.01) |

(52) U.S. Cl.
CPC .............. *A01G 9/024* (2013.01); *A01G 7/04* (2013.01); *A01G 9/246* (2013.01); *A01G 9/247* (2013.01); *A01G 9/249* (2019.05)

(58) Field of Classification Search
CPC .......... A01G 9/24; A01G 9/249; A01G 9/247; A01G 31/06; A01G 31/00; B65G 17/12
See application file for complete search history.

(56) References Cited

U.S. PATENT DOCUMENTS

| | | | | | |
|---|---|---|---|---|---|
| 2,310,461 | A | * | 2/1943 | Regan ..................... | B65G 17/16 |
| | | | | | 198/597 |
| 2,969,867 | A | * | 1/1961 | McClelland ........... | B65G 17/48 |
| | | | | | 414/757 |
| 3,302,615 | A | * | 2/1967 | Tietje ..................... | A01K 1/031 |
| | | | | | 119/419 |
| 3,529,379 | A | * | 9/1970 | Ware ..................... | A01G 31/042 |
| | | | | | 47/17 |
| 4,883,167 | A | * | 11/1989 | Shibata .................. | B65G 17/36 |
| | | | | | 198/712 |
| 9,511,939 | B2 | * | 12/2016 | Zorn ...................... | B65G 17/32 |
| | | | | | 198/801 |

(Continued)

FOREIGN PATENT DOCUMENTS

| | | | | | |
|---|---|---|---|---|---|
| CA | 1106607 | A | * | 8/1981 | ............. A01G 9/249 |
| DE | 102006029569 | A1 | * | 12/2007 | ............. B65G 17/12 |

(Continued)

*Primary Examiner* — Peter M Poon
*Assistant Examiner* — Carly W. Lynch
(74) *Attorney, Agent, or Firm* — Lyon & Harr, LLP; Richard J. Lyon

(57) ABSTRACT

A vertical growing system includes an uppermost multiple arm structure with a series of arms that extend horizontally outward from a vertical post adjacent its top end. Each of these arms includes a gear attached to its distal end which rotates in response to a rotation of the arm. A lowermost multiple arm structure is generally identical to the uppermost multiple arm structure, but adjacent the lower end of the post. Each of the arms of the lowermost multiple arm structure is aligned in the same vertical plane as a corresponding arm of the uppermost multiple arm structure. Each set of vertically aligned arms includes a chain that rotates about the gears of the set. Pairs of plant support bars extend horizontally from opposite sides of the chains at various vertical heights. Each plant support bar supports one or more plant-holding hangers.

22 Claims, 5 Drawing Sheets

(56)                    References Cited

U.S. PATENT DOCUMENTS

| | | | |
|---|---|---|---|
| 12,171,175 B2 * | 12/2024 | Storey | A01G 31/02 |
| 2003/0115795 A1 * | 6/2003 | Clarke | A01G 31/02 |
| | | | 47/60 |
| 2010/0236147 A1 * | 9/2010 | Brusatore | A01G 31/047 |
| | | | 47/65 |
| 2013/0255585 A1 * | 10/2013 | Hamman | A01K 61/59 |
| | | | 119/200 |
| 2015/0351329 A1 * | 12/2015 | Heidl | A01G 9/247 |
| | | | 211/49.1 |
| 2018/0352754 A1 * | 12/2018 | Brusatore | A01G 9/249 |
| 2021/0212270 A1 * | 7/2021 | Booker-Ogunde | A01G 31/06 |
| 2022/0338422 A1 * | 10/2022 | Asperger | A10G 9/022 |

FOREIGN PATENT DOCUMENTS

| | | | | | |
|---|---|---|---|---|---|
| EP | 0220348 | A1 * | 5/1987 | | A01G 31/042 |
| GB | 2040658 | A * | 9/1980 | | A01G 18/62 |
| KR | 20230064838 | A * | 5/2023 | | A47G 7/02 |
| RU | 201064 | U1 * | 11/2020 | | B65G 17/12 |
| WO | WO-2020037417 | A1 * | 2/2020 | | A01G 31/04 |

* cited by examiner

VERTICAL GROWING SYSTEM

CROSS REFERENCE TO RELATED APPLICATION

This application claims the benefit of and priority to provisional U.S. patent application Ser. No. 63/540,445 filed Sep. 26, 2023.

BACKGROUND

In a rapidly industrializing world and exploding population, coupled with the erosion of soil and land for growing, novel approaches to growing food to feed the human population are needed. One promising approach is to utilize vertical space, especially in crowded urban areas, to grow food to feed growing human populations.

SUMMARY

The vertical growing system implementations described herein generally facilitate growing plants by utilizing vertical space. One general implementation takes the form of a system that includes a vertical post secured at its lower end, an uppermost multiple arm structure and a lowermost multiple arm structure. The uppermost multiple arm structure includes a series of uppermost multiple arm structure arms that extend horizontally outward from the vertical post adjacent its top end. Each of the uppermost multiple arm structure arms includes a gear attached to its distal end whose face is oriented perpendicular to the arm and which rotates in response to a driven rotation of the arm or a part thereof about its longitudinal axis. The lowermost multiple arm structure includes a series of lowermost multiple arm structure arms that extend horizontally outward from the vertical post adjacent its lower end. Each of the lowermost multiple arm structure arms is aligned in the same vertical plane as a corresponding arm of the uppermost multiple arm structure, and each of the arms of the lowermost multiple arm structure includes a gear attached to its distal end whose face is oriented perpendicular to the arm and which rotates in response to a driven rotation of the arm or a part thereof about its longitudinal axis. The vertical growing system also includes a plurality of chains. Each chain connects and is rotated about the gears associated with a different set of vertically aligned arms of the uppermost and lowermost multiple arm structures. A plurality plant support bar pairs is connected to each of the plurality of chains. Each plant support bar of each pair of plant support bars extends horizontally from a different side of its associated chain at the same vertical height, with one plant support bar of each pair extending toward the vertical post and the other extending in the opposite direction away from the vertical post. Each plant support bar is capable of supporting one or more plant hangers that each securely hold a plant.

Another implementation is similar to the foregoing general implementation but also includes a plurality of motor assemblies. Each motor assembly is connected to a proximal end of a different one of the arms of the uppermost and lowermost multiple arm structures, and each motor assembly drives the rotation of the arm it is connected to. The uppermost and lowermost multiple arm structure motor assemblies are synchronized with each other such that the gears associated with each set of vertically aligned arms of the uppermost and lowermost multiple arm structures rotate in the same rotational direction and at the same speed. A vertical growing system controller is included that is made up of one or more computing devices, and a vertical growing system control computer program is also included which has a plurality of sub-programs executable by the computing device or devices. The sub-programs configure the computing device or devices to control the motor assemblies to rotate the gears on the uppermost and lowermost arms of the multiple arm structures to bring one or more plants to a particular vertical height. In addition, in another implementation, a watering system is included that is made up of watering arms that extend out from the vertical post. Each of the watering arms includes spray nozzles that spray water onto the plants held in plant hangers supported on the plant support bars in the vicinity of the watering arm. The aforementioned vertical growing system control computer program further includes sub-programs that configure the computing device or devices to control the operation of the watering system to spray water onto the plants held in plant hangers supported on the plant support bars in the vicinity of the watering arm. Yet another implementation is similar to the foregoing general implementation but the one or more plant hangers that are removably hung from each plant support bar and each plant hanger takes the form of a small greenhouse that assists in controlling the environment for a plant held therein.

It is noted that the vertical growing system implementations described herein can be adapted to grow other things than just plants. In general, such a vertical growing system would include a vertical post secured at its lower end, an uppermost multiple arm structure and a lowermost multiple arm structure. The uppermost multiple arm structure includes a series of uppermost multiple arm structure arms that extend horizontally outward from the vertical post adjacent its top end. Each of the uppermost multiple arm structure arms includes a gear attached to its distal end whose face is oriented perpendicular to the arm and which rotates in response to a driven rotation of the arm or a part thereof about its longitudinal axis. The lowermost multiple arm structure includes a series of lowermost multiple arm structure arms that extend horizontally outward from the vertical post adjacent its lower end. Each of the lowermost multiple arm structure arms is aligned in the same vertical plane as a corresponding arm of the uppermost multiple arm structure, and each of the arms of the lowermost multiple arm structure includes a gear attached to its distal end whose face is oriented perpendicular to the arm and which rotates in response to a driven rotation of the arm or a part thereof about its longitudinal axis. The vertical growing system also includes a plurality of chains. Each chain connects and is rotated about the gears associated with a different set of vertically aligned arms of the uppermost and lowermost multiple arm structures. A plurality support bar pairs is connected to each of the plurality of chains. Each support bar of each pair of support bars extends horizontally from a different side of its associated chain at the same vertical height, with one support bar of each pair extending toward the vertical post and the other extending in the opposite direction away from the vertical post. Each support bar is capable of supporting one or more growing structures for holding non-plant organisms being grown.

The foregoing Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the vertical growing system implementations described herein will become better understood with regard to the following description, appended claims, and accompanying drawings where:

DETAILED DESCRIPTION

Figure 1A:
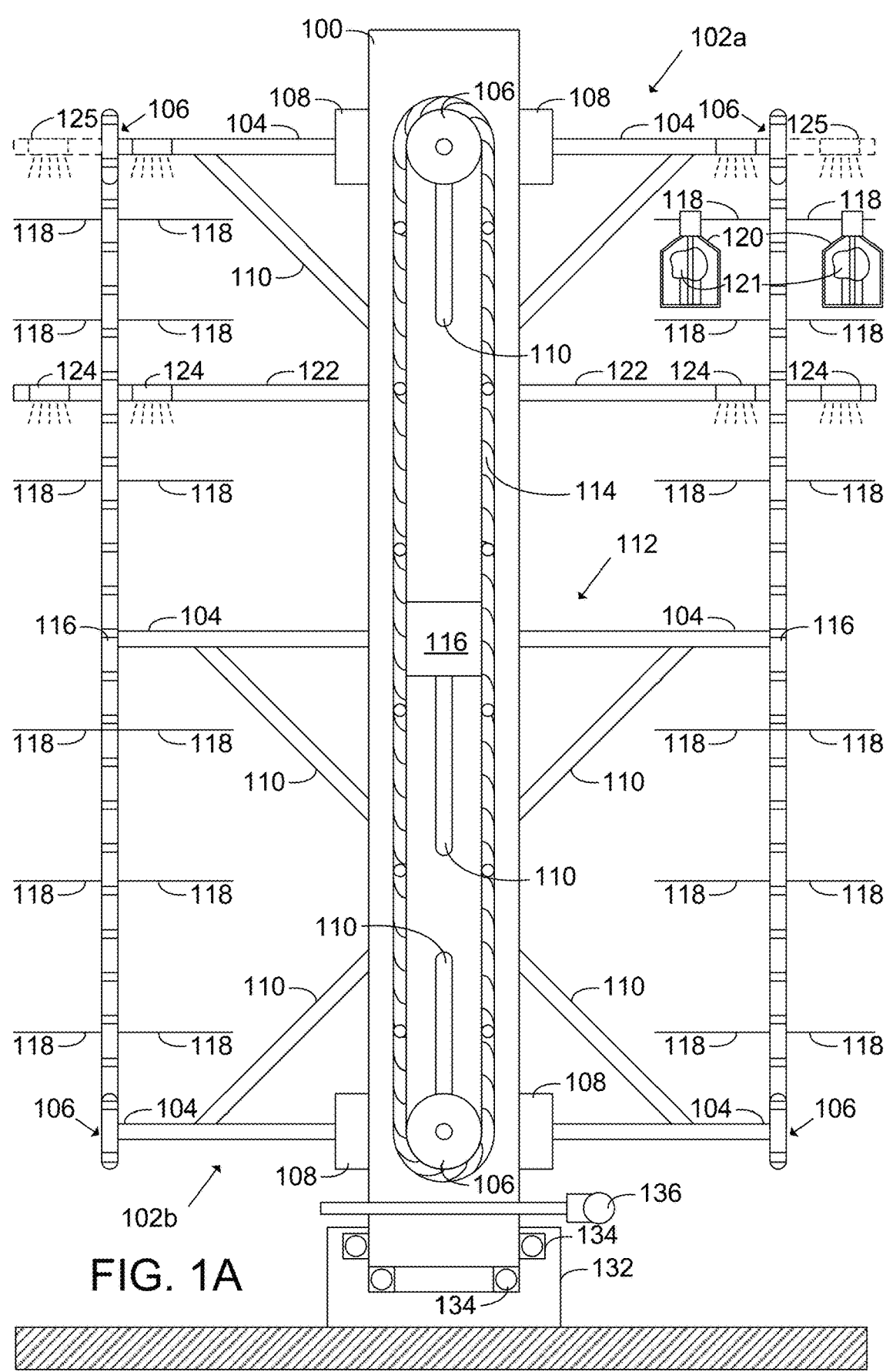
FIG. 1A is a diagram illustrating a front view, in simplified form, of an exemplary implementation of the vertical growing system.

In the following description of the vertical growing system implementations reference is made to the accompanying drawings which form a part hereof, and in which are shown, by way of illustration, specific implementations in which the vertical growing system can be practiced. It is understood that other implementations can be utilized, and structural changes can be made without departing from the scope of the vertical growing system.

It is also noted that for the sake of clarity specific terminology will be resorted to in describing the vertical growing system implementations and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation" means that a particular feature, a particular structure, or particular characteristics described in connection with the implementation or implementation can be included in at least one implementation of the vertical growing system. The appearances of the phrases "in one implementation", "in another implementation", "in an exemplary implementation", "in an alternate implementation", "in one implementation", "in another implementation", "in an exemplary implementation", and "in an alternate implementation" in various places in the specification are not necessarily all referring to the same implementation or implementation, nor are separate or alternative implementations/implementations mutually exclusive of other implementations/implementations. Yet furthermore, the order of process flow representing one or more implementations or implementations of the vertical growing system does not inherently indicate any particular order nor imply any limitations of the vertical growing system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

As utilized herein, the terms "component," "system," "controller" and the like can refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. One or more components can reside within a process and a component can be localized on one computing device and/or distributed between two or more computing devices. The term "processor" is generally understood to refer to a hardware component, such as a processing unit of an electronic circuit. Also as utilized herein, an electronic circuit is composed of individual electronic components, such as resistors, transistors, capacitors, inductors diodes, processors, memory, and so on, connected by conductive wires or traces through which electric current can flow.

1.0 Vertical Growing System

The vertical growing system implementations described herein generally facilitate growing plants by utilizing vertical space, thereby reducing the footprint needed to grow food. One general implementation takes the form of a system that includes a vertical post secured at its lower end, and uppermost and lowermost multiple arm structures. The uppermost multiple arm structure includes a series of arms that extend horizontally outward from the vertical post adjacent its top end. Each of these arms include a gear attached to its distal end whose faces are oriented perpendicular to the arm and which rotate in response to a driven rotation of the arm or a part thereof about its longitudinal axis. The lowermost multiple arm structure also includes a series of arms that extend horizontally outward from the vertical post but adjacent its lower end. Each of the arms of the lowermost multiple arm structure is aligned in the same vertical plane as a corresponding arm of the uppermost multiple arm structure. Each of the arms of the lowermost multiple arm structure includes a gear attached to its distal end whose faces are oriented perpendicular to the arm and which rotates either in response to a driven rotation of the arm or a part thereof about its longitudinal axis or in response to a driven rotation of the corresponding vertically aligned arm of the uppermost multiple arm structure arm or a part thereof about its longitudinal axis. Each set of vertically aligned arms of the uppermost and lowermost multiple arm structures includes a chain that connects and is rotated about the gears of the set of vertically aligned arms. Multiple pairs of plant support bars are also included in the vertical growing system. Each plant support bar of each pair of plant support bars extends horizontally from a different side of the chain at the same vertical height. One plant support bar of each pair extends toward the vertical post and the other extends in the opposite direction away from the vertical post. Each plant support bar is capable of supporting one or more plant hangers. Each plant hanger is used to support a plant in a vertical orientation.

Figure 1B:
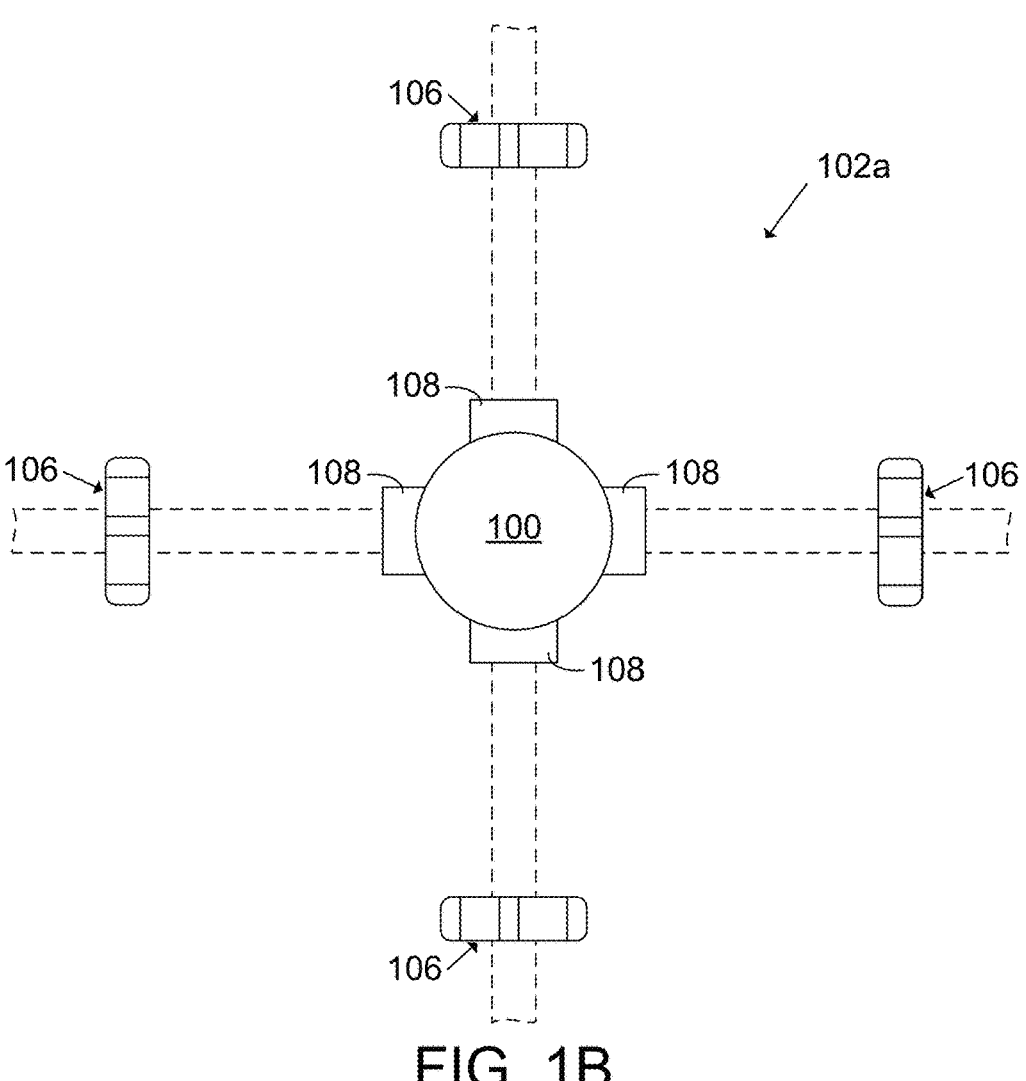
FIG. 1B is a diagram illustrating a top view, in simplified form, of an exemplary implementation of the vertical growing system.

More particularly, in one implementation shown in FIGS. 1A and 1B, the system involves a central, vertical post 100 that is secured at its bottom end. The height of the post 100 can range from a tall tower structure (e.g., 100 stories tall) used in commercial applications to a short cylindrical pole (e.g., 6 foot tall or less) used for personal vertical gardening. At or near the top of the post 100 is an uppermost multiple arm structure 102a. The uppermost multiple arm structure 102a has a series of arms 104 that extend horizontally outward from the central post 100. For example, in one implementation shown in FIGS. 1A and 1B, four arms 104 extend out from the post 100 and are radially equally spaced. However, it is not intended to limit the uppermost multiple arm structure to just four arms. Rather fewer or more arms (e.g., 8) can be employed as desired. At the distal end of each arm is a gear 106. In one implementation, the gear 106 is of the type used to drive a chain 116, such as the drive gear and chain used in a bicycle. In other implementations, especially large-scale implementations, the chain and gears are bigger and stronger to hold and move heavy loads. For example, the chain and gears could be more like the treads and wheels used on a tank. In one version, the gear 106 is oriented perpendicular to the arm 104. The gear 106 is rotated by rotating the arm 104 (or a shaft located within the arm), where the arm or shaft is attached to the central bore of the gear. A lowermost multiple arm structure 102b is located toward the bottom of the vertical post 100 and is generally identical to the uppermost multiple arm structure 102a, including having the same number of equal length arms that have a radial spacing identical to the uppermost multiple arm structure. The lowermost multiple arm structure 102b is located at a height up the post 100 that at least allows clearance for the type of plants being grown on the vertical growing system to pass below the lowermost multiple arm structure, although it could also be placed higher to clear other objects or structures that are located at the base of the vertical post. Each arm 104 of the lowermost multiple arm structure 102b is aligned in the same vertical plane as a corresponding arm 104 of the uppermost multiple arm structure 102a, thereby forming a number of sets of vertically aligned arms between the uppermost and lowermost multiple arm structures.

Motor assemblies are employed to rotate the arms (or arm shafts). In the implementation shown in FIGS. 1A and 1B, each arm 104 is rotated using a separate motor assembly 108 attached to the vertical post 100 and connected to a proximal end of the arms of the uppermost and lowermost multiple arm structures 102a, 102b. In one implementation, the motor assemblies 108 connected to the arms 104 of the uppermost and lowermost multiple arm structures 102a, 102b are synchronized with each other such that the gears 106 associated with each set of vertically aligned arms of the uppermost and lowermost multiple arm structures rotate in the same rotational direction and at the same speed.

Figure 2:
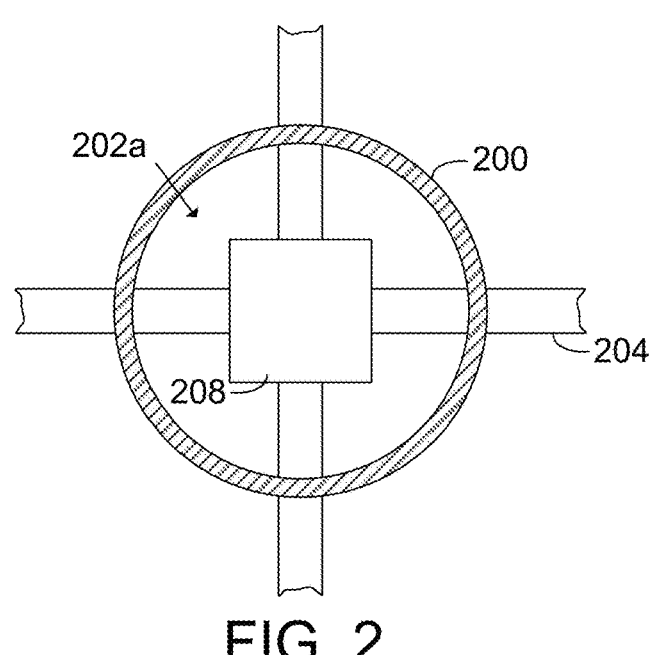
FIG. 2 is a diagram illustrating a top view, in simplified form, of one implementation of the vertical growing system, which is cutoff at a point on the vertical post just above an uppermost multiple arm structure, and shows a motor assembly located in a hollow portion of the post which is capable of rotating all four arms of the uppermost multiple arm structure at once in the same direction and speed.

In an alternate implementation, the motor assemblies are located within a hollow portion of the post. While a separate motor assembly can be connected to each arm of the uppermost and lowermost multiple arm structures in this alternate implementation, locating the motor assemblies inside a hollow portion of the post is particularly amenable to configuring a motor assembly to rotate two or more of the arms (or arm shafts) of a multiple arm structure simultaneously. For example, as shown in FIG. 2, as viewed looking down into a cutoff portion of the vertical post 200 at a point just above an uppermost multiple arm structure 202a having 4 arms 204, a motor assembly 208 capable of rotating all four arms at once in the same direction and speed is located in a hollow portion of the post. A similar motor assembly arrangement can be employed to rotate the arms of the lowermost multiple arm structure as well.

Referring again to FIGS. 1A and 1B, it is further noted that, if necessary, owing to the length of an arm 104, a support 110 can be employed which is attached to the vertical post at its proximal end and to the arm at its distal end. If the arm is rotated rather than a shaft inside the arm, then the distal end of the support is configured so as to hold the arm in its horizontal extended position without interfering with the arm's rotation.

Depending on the overall height of the vertical post 100, additional intermediate multiple arm structures 112 can be located at heights between the uppermost and lowermost multiple arm structures 102a, 102b (one of which is shown in FIG. 1A). The number of intermediate arm structures is in part determined by how long a chain 114 (as will be described next) that runs between each vertically adjacent pair of gears 106 can be while remaining taut under load from the plants being grown (as will become evident in the description to follow). The intermediate multiple arm structures 112 are similar to the uppermost and lowermost arm structures 102 except the previously described gear is replaced with a chain tensioning apparatus 116 that keeps the chain taut. The arms of the various multiple arm structures employed are the same length and are aligned rotationally about the vertical post so that each arm in the uppermost multiple arm structure lines up in the same vertical plane as an arm in each lower-placed multiple arm structure. In this way, the chain 114 running on a gear 106 at the end of an arm of the uppermost multiple arm structure 102a will extend down to the gear associated with the arm of the lowermost multiple arm structure 102b, and the chain will reside in a vertical plane that is parallel to the longitudinal axis of the vertical post 100. The chain 114 has a structure similar to a bicycle chain with links that interface with the teeth of the aforementioned gears 106. Attached to each side of the chain 114 between some of the links of the chain are plant support bars 118 that extend outward. Plants are hung from these plant support bars 118, so each pair of plant support bars is attached to the chain 114 at a distance from adjacent plant support bar pairs that accounts for the vertical height of the plants. It is noted that plant support bars 118 of each pair of plant support bars extend from each side of the chain 114 so as to balance the weight. In this way, while a downward force is placed on the chain 114, there is no substantial torque that could cause the chain to become misaligned and disengage from the gears 106 if the weight of the plants hanging from the plant support bars on each side is not balanced.

Figures 3A, 3B:
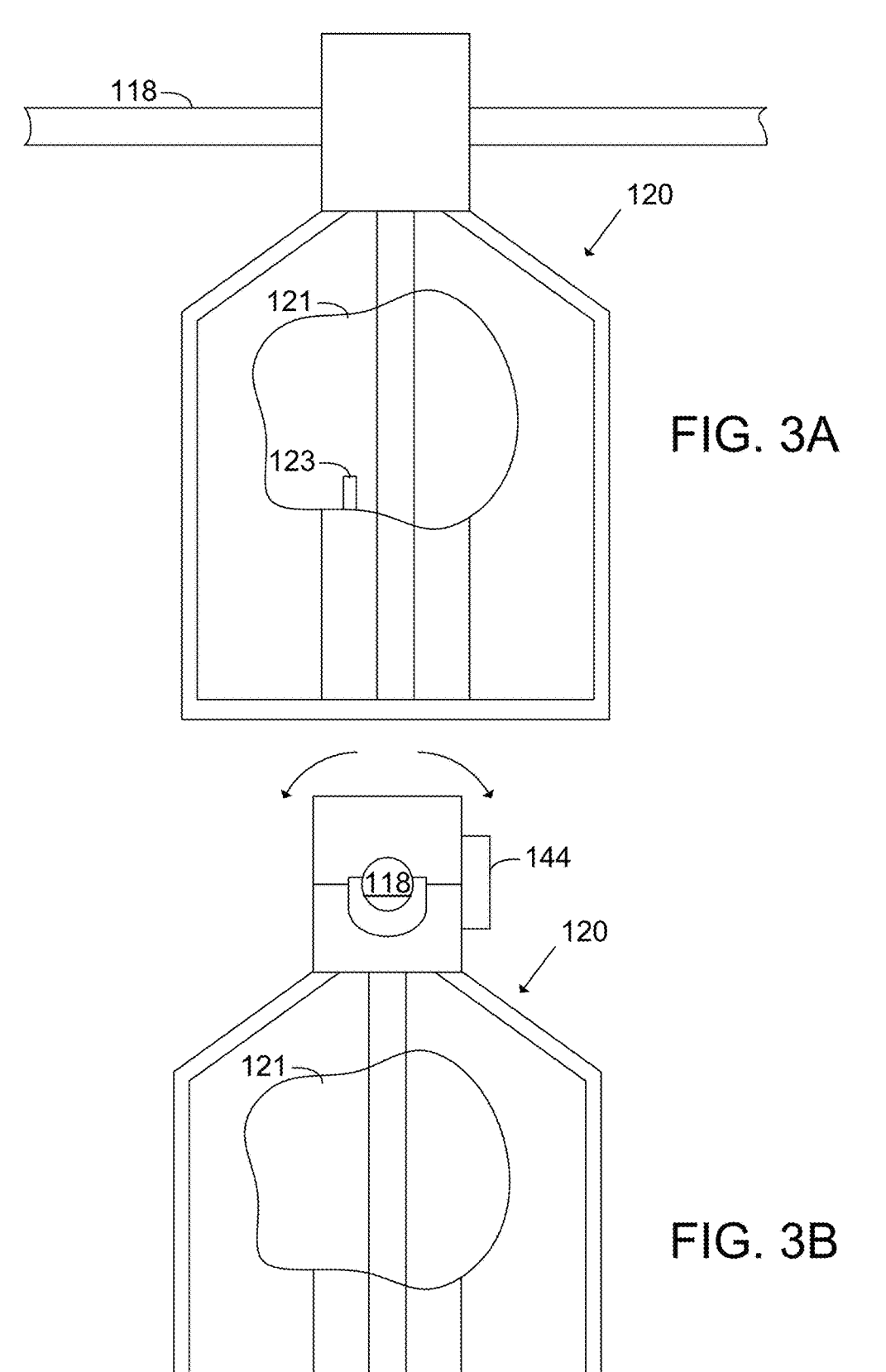
FIG. 3A is a diagram illustrating a front view, in simplified form, of one implementation of a plant hanger used to support plants in the vertical growing system.
FIG. 3B is a diagram illustrating a side view, in simplified form, of one implementation of a plant hanger used to support plants in the vertical growing system.

In one implementation, as best shown in FIGS. 3A and 3B, plant hangers 120 are attached to the plant support bars 118 into which a plant 121 can be securely placed. The plant hangers 120 are designed to rotate about the plant support bars 118 they are attached to. This allows the plants 121 to remain vertical when the portion of the chain the plant support bar is attached to rotates over the top of the gear on an arm of the uppermost multiple arm structure or around the bottom of the gear on an arm of the lowermost multiple arm structure. It is noted that while FIG. 1A shows only one plant 121 being hung from a plant support bar 118 for simplicity purposes, it is not intended to limit the vertical growing system to the depicted configuration. Rather, the number of plants hung from a plant support bar can be much larger, especially in large-scale implementations. For example, it is envisioned that large-scale implementations of the vertical growing system could have 50 or more plants hanging from each plant support bar.

In one version, the plant hangers take the form of a small greenhouse that assists in controlling the environment for a plant. For example, the individual greenhouse plant hanger could have movable panels with opening/closing mechanisms that are either remote controlled, or self-controlled via an onboard controller. The panels are opened to a degree that maintains an optimum temperature, humidity, and air flow for the plants (as measured by sensors associated with the controller as will be described in a section to follow), or to allow water from rain or a watering system to reach the plant.

It is further noted that in one implementation (such as the implementation depicted in FIGS. 1A and 1B), the diameter of the gears 106 on the uppermost and lowermost multiple arm structure arms 104 are the same and are chosen to be large enough that plants 121 held in plant hangers 120 supported on the plant support bars 118 that extend toward the vertical post 100 are able to pass by the vertically aligned arms without being damaged when the gears are rotating. Additionally, the diameters of the uppermost and lowermost multiple arm structures 102a, 102b when viewed from above the vertical growing system are the same and large enough that plants 121 held in plant hangers 120 supported on the plant support bars 118 on both sides of the chain 114 associated with each different set of vertically aligned arms of the uppermost and lowermost multiple arm structures do not interfere with plants hung from the plant support bars extending from a chain associated with an adjacent set of vertically aligned arms. This ensures that the plants can pass by one another when the gears associated with a set of vertically aligned arms are rotating.

The vertical growing system also includes a watering system employed to periodically water the plants. In one implementation, the watering system includes watering arms 122 that extend out from the vertical post, and which incorporate spray nozzles 124 that spray water on the plants close to the arm (one of which is shown in FIG. 1A). These watering arms 122 are arranged in one or more sets of radially distributed watering arms that equal the number of arms 104 in each of the uppermost or lowermost multiple arm structures 102a, 102b and which reside at the same height along the vertical post 100. The watering arms 122 extend as far as the last plant 121 on the plant support bars 118 that extend outward from the chain 114. In one version, the watering arms 122 are vertically aligned with the arms 104 of the uppermost and lowermost multiple arm structures 102a. 102b, as well as the arms of any intermediate multiple arm structures 112, so as to not interfere with the plants 121 as they pass by when the gears 106 associated a group of vertically aligned arms are rotated. The nozzles of each watering arm 122 are directed to spray (see above) water on the plants 121 hung from the plant support bars on both sides of the chain 114. The watering system can be configured to water the plants without moving them in a watering position. In this version, a different watering arm 122 would be vertically aligned with each of the sets of vertically aligned arms of the multiple arm structures 102a, 102b, 112. It is noted that the plants 121 hanging from the plant support bars 118 extending from a chain 114 associated with a set of vertically aligned arms 104 form consecutive rows of plants each at a different height from the bottom of the vertical post 100. Each watering arm 122 is configured with nozzles 124 capable of watering the plants 121 hanging from the plant support bars 118 extending from a chain 114 for a prescribed number of consecutive rows (e.g., 5 rows). As such, for each set of vertically aligned arms, a watering arm 122 extends out from the vertical post 100 every prescribed number of rows to ensure all the plant rows get watered. In an alternate version, the watering system can be configured to water the plants by moving them in a watering position. In this version, like the previous version, a different watering arm 122 would be vertically aligned with each of the sets of vertically aligned arms of the multiple arm structures 102a, 102b, 112. Each watering arm 122 is configured with nozzles 124 capable of watering the plants 121 hanging from the plant support bars 118 extending from a chain 114 for a prescribed number of consecutive rows which can be just one row. However, unlike the previous version that requires additional watering arms every prescribed number of rows, this version does not because the plants rows are moved by rotating the gears to bring the prescribed number of plant rows into position to be watered by the watering arm. Further, in another implementation, the watering arms of the watering system are incorporated into the existing multiple arm structures. As shown in broken lines in FIG. 1A, in this alternate implementation each arm 104 in the uppermost multiple arm structure 102a would incorporate features of the previously described watering arms 122. This would include a watering extension 125 that extends from the distal end of each multiple arm structure arm that waters the plants hanging on the plant support bars that extend outward from the chain. The water used by the watering system can be obtained various way, such as via an existing water supply infrastructure (e.g., so-called city water), via appropriately filtered ground water or water from nearby water sources (e.g., lakes, ponds, streams rivers, etc.), via on-site water producing or water collection systems, and so on. The water is pumped from the bottom of the vertical post to the watering arms using a pump mechanism (not shown). The water can be pumped in water supply lines (not shown) that are attached to the outside of the vertical post or routed up through a hollow interior of the post. It is further noted that the pump mechanism can be equipped with a plant food injector device that adds plant food to the water that is being pumped up to the watering arms. Alternately, if more precise watering is desired to save water and to prevent overflow which could fall on objects below the vertical watering system, watering tubes, rather than the aforementioned nozzles, that extend from the watering arms to the location of plants being watered by the watering arm, could be employed in implementations where the watering system is configured to water the plants without moving them in a watering position.

Figure 4:
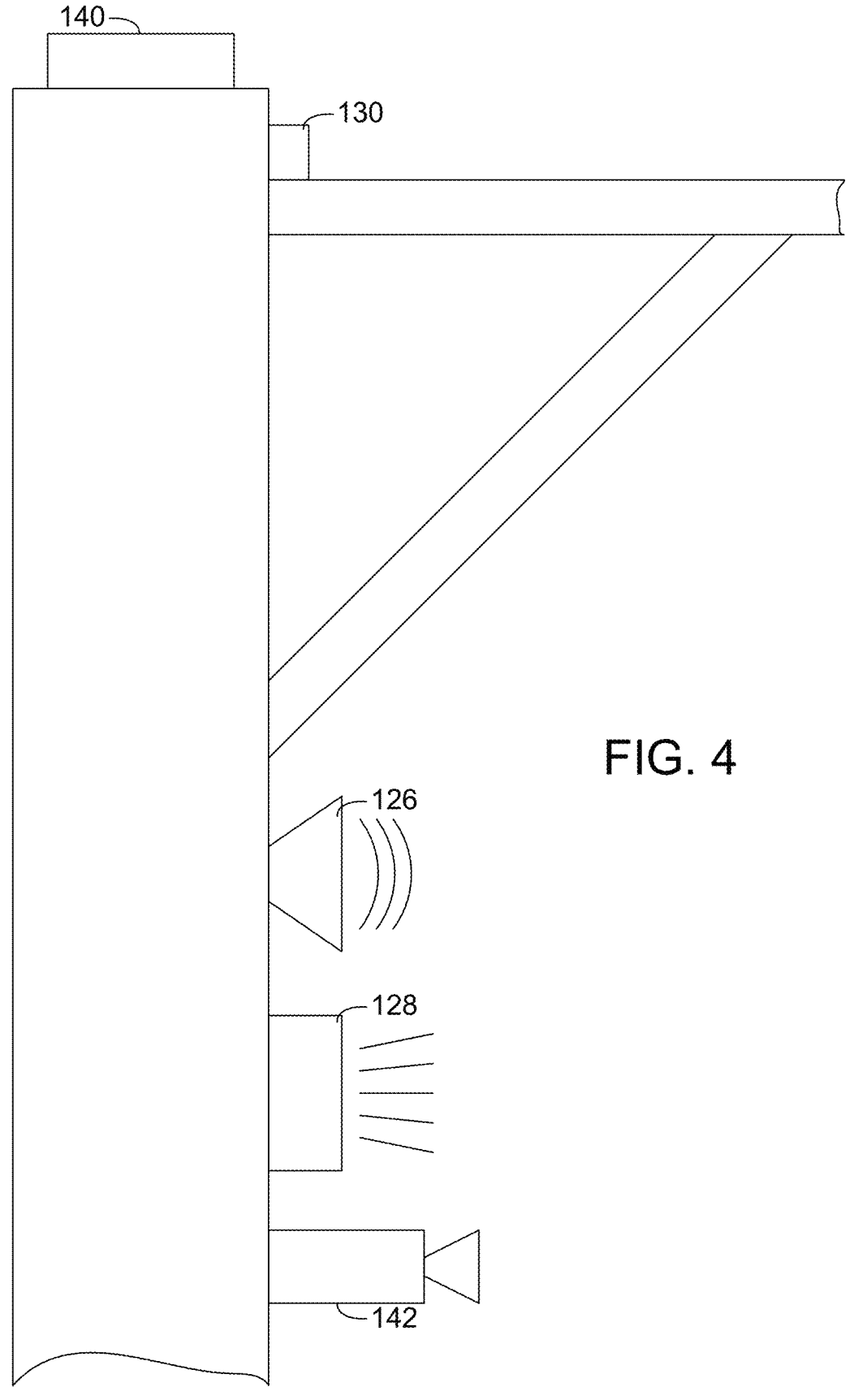
FIG. 4 is diagram illustrating a partial side view, in simplified form, of the vertical growing system of FIG. 1A showing various optional components such as a speaker, light, camera vibration producing unit and light sensors.

In addition to the watering system, the vertical growing system can include other systems that are known to benefit the plants and encourage growth. For example, an audio system can be included. This audio system would have speakers 126 attached to the vertical post (as shown in FIG. 4), or to the watering arms, or to the arms of the multiple arm structures, or any combination of the foregoing. While not every arm would have a speaker, enough speakers are placed on the vertical post or arms, at different heights, to ensure the sound waves produced by the speakers reaches every plant with enough intensity to benefit the plant. The speakers would be electrically connected either via a wired or wireless connection to a signal generating source. If the connection is wired, power could also be provided. Otherwise, the speakers would be self-powered, such as via batteries and/or solar cells incorporated into the speakers. Each speaker would produce sounds that are known to be beneficial to plants. For example, ultrasonic sound waves and audible (to humans) sound waves are known to enhance plant growth and repel pests that could damage plants. It is also conjectured that playing music benefits plants. If necessary, each speaker could have more than one sound producing element so that sound waves of various frequencies can be produced. Further, a lighting system can be included in the vertical growing system. This lighting system would have lights 128 attached to the vertical post (as shown in FIG. 4), or to the watering arms, or to the arms of the multiple are structures, or any combination of the foregoing. While not every arm would have a light, enough lights are placed on the vertical post or arms, at different heights, to ensure the light produced reaches every plant with enough intensity to benefit the plant. In one version, the lights would be electrically connected either via a wired or wireless connection to a controller that individually turns each light on or off and controls the intensity of the light produced by each light. If the connection is wired, power could also be provided. Otherwise, the lights would be self-powered, such as via batteries and/or solar cells incorporated into the lights. Each light would produce light at frequencies that are known to be beneficial to plants. For example, light in the so-called Photosynthetically Active Radiation (PAR) range that includes wavelengths from 400-700 nm, as well as possibly light in the ultraviolet and far-red frequency ranges, are believed to benefit plants. The intensity of light at these various frequencies can also be manipulated to optimize the benefit to plants and be changed depending on the stage of growth a plant is in over time. Light emitting diode (LED) technology can be employed to produce light at the desired frequencies while minimizing the electrical power requirements needed to operate the lights. Still further, a vibration system can be included in the vertical growing system. This vibration system would have vibration producing units 130 attached to the arms of the multiple arm structures, as shown in FIG. 4. In one version, the vibration producing units would be electrically connected either via a wired or wireless connection to a controller that individually turns each unit on or off and controls the intensity of the vibrations produced by unit. If the connection is wired, power could also be provided. Otherwise, the vibration producing units would be self-powered, such as via batteries and/or solar cells incorporated into the units. Each vibration producing unit would produce vibrations at frequencies that are known to be beneficial to plants. For example, plants are believed to react favorably to low levels of vibration around 115-250 Hz.

Referring again to FIG. 1A, in one implementation the vertical post 100 is held inside a supporting post 132 which is attached to the ground or other flat surface (e.g., a roof) and is secured therein as a male/female fitting with ball bearings 134 situated between the post and the supporting post. A vertical post motor 136 is attached to the post 100 that allows the post to rotate within the supporting post 132 as desired to promote maximum sunlight exposure to the plants.

In one implementation, the vertical growing system is automated and controlled via a vertical growing system controller, which includes one or more computing devices located on or near the vertical growing system, or located remotely in which case the computing device or devices would be in communication with the various components of the vertical growing system via a wireless communication path and a computing network such as the Internet or an intranet. The vertical growing system also includes a vertical growing system control computer program having a plurality of sub-programs executable by the computing device or devices of the vertical growing system controller. For example, in one implementation these sub-programs configure the computing device or devices to control the motor assembly or assemblies that rotate the gears on the arms of the uppermost and/or lowermost multiple arm structures. In another implementation, the aforementioned sub-programs also control the operation of the watering system. In yet another implementation, the aforementioned sub-programs also control the operation of the audio system, lighting system, and vibration system, if included. Still further, in another implementation, the aforementioned sub-programs control the vertical post motor. Further, in one implementation, the vertical growing system controller receives information about the status of the vertical growing system from a series of sensors. For example, as shown in FIG. 3A, a soil moisture sensor 123 could be placed in the soil of all or some of the plants to determine when the plants need more water. As shown in FIG. 4, light sensors 140 could be, for example, placed at the top of the vertical post and connected to the vertical growing system controller via a wired or wireless connection. The output of these light sensors would be used to determine which direction the sunlight is coming from so that the vertical post could be rotated to ensure the plants get the desired amount of direct sunlight. If remotely controlled greenhouse plant holders are employed, information from temperature, humidity, and air flow plant hanger sensors (among others) could be provided wirelessly to the vertical growing system controller and used by the vertical growing system control computer program sub-programs to control the opening mechanism of each greenhouse plant holder's panels to create and maintain an optimum growing environment for the plant, or to allow water from rain or a watering system to reach the plant.

In one implementation, as shown in FIG. 4, digital cameras 142 are attached to the vertical post and/or the arms of the multiple arm structures. Enough cameras would be employed so that all the plants could be imaged by at least one camera. The images output from the cameras could be monitored by caretaker personnel who would assess the health of the plants and their stage of growth. The stage of growth could be used to determine whether a plant is matured and ready for harvesting, or whether fruit growing on the plant has ripened and is ready to pick, or flowers have bloomed and are ready for cutting, and so on. Alternately, the vertical growing system controller could be programmed to analyze images from the cameras and automatically determine the same things a caretaker would surmise from the images. For example, a program trained to recognize when a plant needs water, or is ready for harvest, and so on could be employed.

Based on information derived from the camera images, or for other reasons such as adding or replacing plants, or watering the plants, and so on, the vertical growing system controller can be utilized to rotate the gears on the uppermost and lowermost arms of the multiple arm structures to bring plants to a particular vertical height. If a separate motor assembly is used to rotate the gears associated with each of the sets of vertically aligned arms, then it is possible for the vertical growing system controller to move just specific plants (and the other plants hanging from the same plant support bar and the plant support bar on the other side of the chain) to a particular height. Whether all the plants must be moved together, or just some of them, there are a variety of reasons to do so. For example, plants can be moved to a location where they can be watered if there are not enough watering stations along the entire vertical height of the vertical post to water all the plants without moving them. Another example is moving plants to an offload location such as the just below an arm associated with the lowermost multiple arm structure. Plants moved into the offload position can then be removed from the vertical growing system for harvesting, or to treat a disease, or so on. The plants can be removed from a plant support bar, or a new plant can be placed on a plant support bar by hand, however the process can also be automated using robotic arms. In either case, as shown in FIGS. 3A and 3B, the attachment and removal process can be facilitated by incorporating a quick release mechanism 144 in the plant hangers that allows the hangers to be readily attached to or removed from a plant support bar.

The large-scale versions of the vertical growing system can be further automated by employing a conveyor device (such a conveyor belt) to move plants removed from a plant support bar to another location, with or without the plant hanger attached. For example, the other location could be an indoor facility for the harvesting and packaging of the plants. The use of the conveyor device can also eliminate the need for heavy field equipment.

It is noted that the vertical growing system implementations described herein are not solely reliant on the previously described movement of the plants to perform routine maintenance functions such as pruning the plants, providing plant food or medicines, picking fruit, and so on. Rather the system is amenable to the use of drones to attend to these functions. It would also be possible to employ robotic arms attached to the vertical post to reach out and attend to the plants or to remove a plant from its plant support bar and place it on an elevator that is attached to the vertical post to take the plants down to the bottom of the post for care. The elevator could also be used to lift a plant up to a plant support bar where a robotic arm would place it on the bar.

The vertical growing system implementations described herein can be constructed and operated indoors or outdoors. However, operating the system outdoors is particularly advantageous because the plants can be grown using natural sunlight. As such, less electrical power is required to grow the plants, such as would be needed to power artificial lighting if the system were operated indoors. Also being located outdoors facilitates the use of solar cells to generate the electrical power that can be used to run the electrical systems of the vertical growing system at least partially. Still further, being outdoors facilitates the use of wind power to generate electricity to run the system. For example, a wind turbine could be affixed to the top of the system to provide for the collection and/or utilization of electricity.

The vertical growing system has many advantages. The system takes advantage of often unused vertical space and requires a relatively small footprint. This means that the vertical growing system can be put in place almost everywhere (e.g., on top of a supermarket, or in a parking lot of a supermarket, school, stadium, and so on). In addition, the vertical growing system is readily scalable such that it can be made large enough to support large-scale commercial growing operations, as well as small enough for use in personal home gardening. Small versions of the system can also be used under the windows of dwellings and businesses for the plantation of herbs, flowers or any other plants that allows the window to have a change of scenery as desired. In addition, implementations of the vertical growing system can be adapted to use existing towers and posts, such as lighting posts in parking lots. Still further, the vertical growing system can be adapted to operate in an offshore environment, such as on floating platforms or by using an anchoring scheme similar to offshore wind turbines. Another advantageous use for the vertical growing system would be on-site growing of vegetables and fruits at a grocery store or restaurant, or other businesses where food is sold to the public. A customer would be attracted to buying fresh fruit and vegetables picked right from the plant while they watched. Alternately, a customer could be allowed to pick their own produce from a plant growing on the vertical growing system.

2.0 Additional Implementations

While the foregoing description of the vertical growing system described growing plants in pots with soil, it would also be possible to grow the plants in water using a hydroponic system. Further, the vertical growing system's plant support bars can be modified to support growing structures for holding any organism being grown, not just plants. For example, the vertical growing system could be adapted to raise fish in tanks or chickens in cages hung from the plant support bars. Still further, in one implementation the plant hangers on at least some of the plant support bars could be replaced with a single long trough filled with soil or water, and with plants spaced along the trough. The trough would hang from the bar using multiple hooks that can include quick-release mechanisms. The use of long troughs also presents the possibility of placing biofuel producing algae in hollow transparent facia attached to the exterior sides of the troughs that receive sunlight.

In yet another additional implementation, rather than employing a vertical post that is secured at its bottom end, the post would be attached at its top end to a cantilever arm that extends out from the post. In this additional implementation, the post could be configured as a vertical growing system as described previously but would also have multiple cantilevered vertical growing systems (e.g., 4) attached at the top end of the post.

It is also noted that any or all of the aforementioned implementations throughout the description may be used in any combination desired to form additional hybrid implementations. In addition, although the vertical growing system implementations have been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims. In regard to the various functions performed by the above described components and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

3.0 Exemplary Operating Environments

Figure 5:
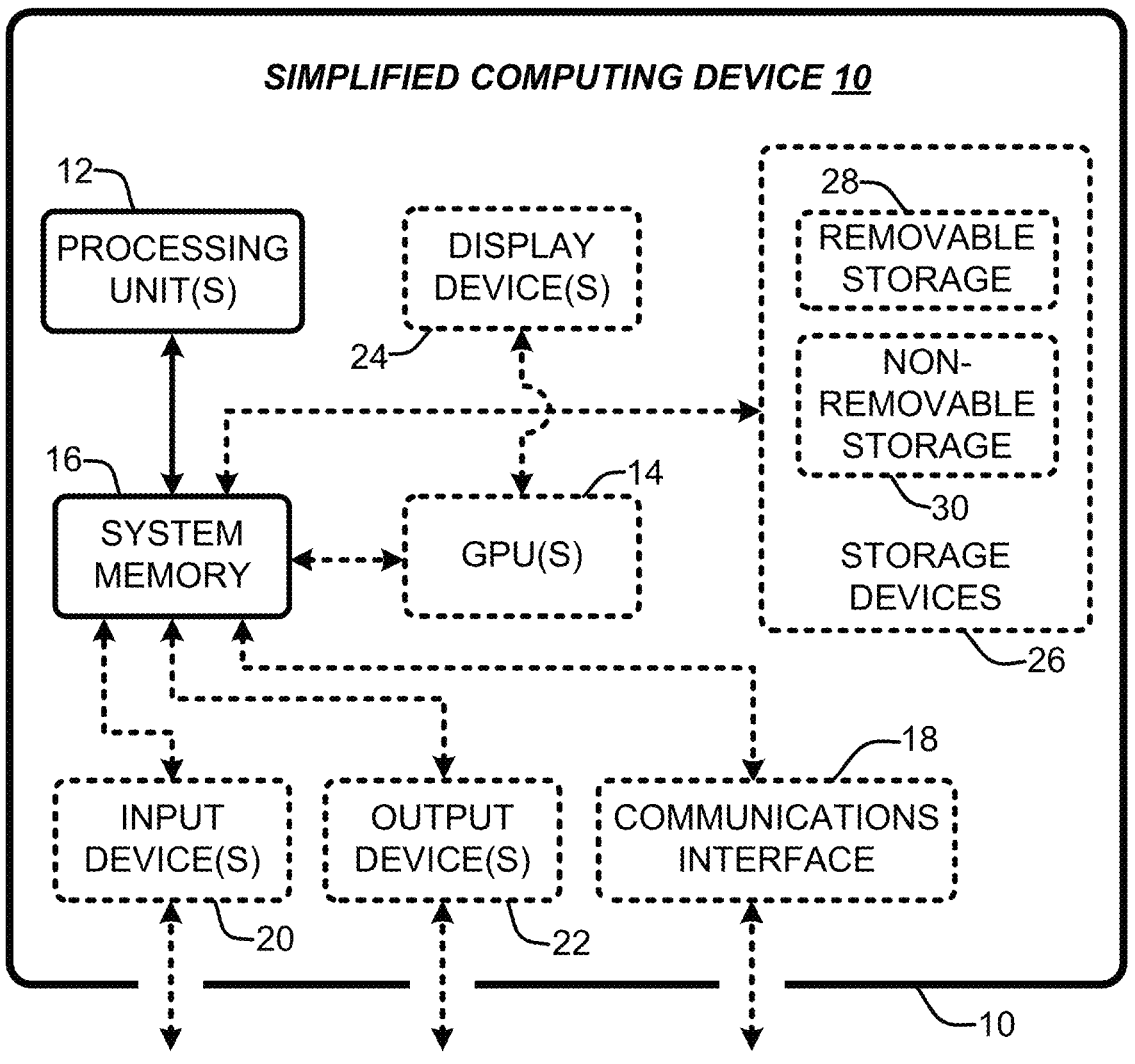
FIG. 5 is a diagram illustrating a simplified example of a general-purpose computer system on which various implementations and elements of the vertical growing system, as described herein, may be realized.

The previously described electronic processor and memory components of the vertical growing system implementations can employ numerous types of general purpose or special purpose computing system environments or configurations. FIG. 5 illustrates a simplified example of a general-purpose computer system on which various implementations and elements of the vertical growing system, as described herein, may be implemented. It is noted that any boxes that are represented by broken or dashed lines in the simplified computing device 10 shown in FIG. 5 represent alternate implementations of the simplified computing device. As described below, any or all of these alternate implementations may be used in combination with other alternate implementations that are described throughout this document. The simplified computing device 10 is typically found in devices having at least some minimum computational capability such as microprocessor-based systems, programmable consumer electronics, and minicomputers.

The computing device should have sufficient computational capability and system memory to enable basic computational operations. In particular, the computational capability of the simplified computing device 10 shown in FIG. 5 is generally illustrated by one or more processing unit(s) 12, and may also in some implementations include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature described herein, including input, output, control, feedback, and response to one or more users or other devices or systems associated with the vertical growing system implementations, are enabled by a variety of Natural User Interface (NUI) scenarios. The NUI techniques and scenarios enabled by the vertical growing system implementations include, but are not limited to, interface technologies that allow one or more users to interact with the vertical growing system implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects, or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the vertical growing system implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the vertical growing system implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 5 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various vertical growing system implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Some aspects of the vertical growing system implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. Some aspects of the vertical growing system implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor. Still further, aspects of the vertical growing system implementations described herein can be virtualized and realized as a virtual machine running on a computing device such as any of those described previously.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

Wherefore, what is claimed is:

1. A vertical growing system, comprising:
a vertical post secured at its lower end;
an uppermost multiple arm structure, comprising,
    a series of uppermost multiple arm structure arms that extend horizontally outward from the vertical post adjacent its top end, wherein each of the uppermost multiple arm structure arms comprises a gear attached to its distal end whose face is oriented perpendicular to the arm and which rotates in response to a driven rotation of the arm or a part thereof about its longitudinal axis;
a lowermost multiple arm structure, comprising,
    a series of lowermost multiple arm structure arms that extend horizontally outward from the vertical post adjacent its lower end, wherein each of the lowermost multiple arm structure arms is aligned in the same vertical plane as a corresponding arm of the uppermost multiple arm structure, and wherein each of the arms of the lowermost multiple arm structure comprises a gear attached to its distal end whose face is oriented perpendicular to the arm and which rotates in response to a driven rotation of the arm or a part thereof about its longitudinal axis;
a plurality of chains, wherein each chain connects and is rotated about the gears associated with a different set of vertically aligned arms of the uppermost and lowermost multiple arm structures; and
a plurality plant support bar pairs connected to each of said plurality of chains, wherein each plant support bar of each pair of plant support bars extends horizontally from a different side of its associated chain at the same vertical height, with one plant support bar of each pair extending toward the vertical post and the other extending in the opposite direction away from the vertical post, and wherein each plant support bar is capable of supporting one or more plant hangers that each securely hold a plant.

2. The vertical growing system of claim 1, wherein each of the one or more plant hangers attaches to and is free to rotate about the plant support bar it is supported from, and is used to securely hold a plant in a vertical orientation whether the chain the plant support bar supporting the plant hanger is connected to is rotating about said gears or not.

3. The vertical growing system of claim 1, wherein the gears associated with each set of vertically aligned arms of the uppermost and lowermost multiple arm structures have the same diameters, and said diameters are chosen so that plants held in plant hangers supported on the plant support bars on opposite sides of the chain associated with the plant support bars that extend toward the vertical post are able to pass by the vertically aligned arms without being damaged when the gears are rotating.

4. The vertical growing system of claim 1, wherein the diameters of the uppermost and lowermost multiple arm structures when viewed from above the vertical growing system are the same and large enough that plants held in plant hangers supported on the plant support bars on both sides of the chain associated with each different set of vertically aligned arms of the uppermost and lowermost multiple arm structures are able to pass by the plants held in plant hangers supported on the plant support bars associated with each adjacent set of vertically aligned arms of the uppermost and lowermost multiple arm structures without being damaged when the gears are rotating.

5. The vertical growing system of claim 1, wherein the lowermost multiple arm structure is positioned at least a distance from the lower end of the vertical post that allows the plants held in plant hangers supported on the plant support bars to pass over any structures located below the lower end of the vertical post without being damaged when the gears are rotating.

6. The vertical growing system of claim 1, further comprising watering arms that extend out from the vertical post, each of which comprises spray nozzles that spray water onto the plants held in plant hangers supported on the plant support bars in the vicinity of the watering arm.

7. The vertical growing system of claim 6, wherein the watering arms are arranged in one or more sets of radially distributed watering arms that equal the number of arms of the uppermost or lowermost multiple arm structures and which reside at the same height along the vertical post.

8. The vertical growing system of claim 7, wherein each watering arm of each set of watering arms is aligned in the same vertical plane as a different one of said set of vertically aligned arms of the uppermost and lowermost multiple arm structures.

9. The vertical growing system of claim 7, wherein there is one set of watering arms, and plants held in plant hangers supported on the plant support bars are watered by rotating the gears of the uppermost and lowermost multiple arm structures to bring the plants to a height that is in the vicinity of the set of watering arms and spraying water onto the plants via the spray nozzles.

10. The vertical growing system of claim 7, wherein there is a set of watering arms located at different heights along the vertical post wherein the different heights are chosen such that all the plants held in plant hangers supported on the plant support bars can be watered by spraying water onto the plants via the spray nozzles.

11. The vertical growing system of claim 1, further comprising a plurality of motor assemblies, wherein each motor assembly is connected to a proximal end of a different one of the arms of the uppermost and lowermost multiple arm structures, and wherein each motor assembly drives the rotation of the arm it is connected to, and wherein the uppermost and lowermost multiple arm structure motor assemblies are synchronized with each other such that the gears associated with each set of vertically aligned arms of the uppermost and lowermost multiple arm structures rotate in the same rotational direction and at the same speed.

12. The vertical growing system of claim 1, further comprising one or more uppermost multiple arm structure motor assemblies, wherein each of the uppermost multiple arm structure motor assemblies is connected to a proximal end of a different one or more of the arms of the uppermost multiple arm structures, and wherein each motor assembly drives the rotation of the arm or arms it is connected to.

13. The vertical growing system of claim 12, further comprising one or more lowermost multiple arm structure motor assemblies, wherein each of the lowermost multiple arm structure motor assemblies is connected to a proximal end of a different one or more of the arms of the lowermost multiple arm structures, and wherein each motor assembly drives the rotation of the arm or arms it is connected to and is synchronized with the one or more uppermost multiple arm structure motor assemblies such that the gears associated with each set of vertically aligned arms of the uppermost and lowermost multiple arm structures rotate in the same rotational direction and at the same speed.

14. The vertical growing system of claim 1, further comprising at least one intermediate multiple arm structure located at a height along the vertical post that is in between the uppermost and lowermost multiple arm structures, wherein each intermediate multiple arm structure comprises a series of intermediate multiple arm structure arms that extend horizontally outward from the vertical post, and wherein each intermediate multiple arm structure arm is aligned in the same vertical plane as a corresponding arm of the uppermost and lowermost multiple arm structures, and wherein each of the intermediate multiple arm structure arms comprises a chain tensioning apparatus attached to its distal end that keeps the chain connecting the gears associated with the corresponding vertically aligned arms of the uppermost and lowermost multiple arm structures taut.

15. The vertical growing system of claim 1, wherein each of the arms of the uppermost and intermediate multiple arm structures further comprise spray nozzles that spray water onto the plants held in plant hangers supported on the plant support bars in the vicinity of the arm.

16. The vertical growing system of claim 1, further comprising at least one of:
  (a) audio speakers that produce sounds that are known to be beneficial to plants; or
  (b) lights that produce light at frequencies that are known to be beneficial to plants; or
  (c) vibration producing units that produce vibrations at frequencies that are known to be beneficial to plants.

17. The vertical growing system of claim 1, wherein the vertical post rotates about its longitudinal axis to increase the sunlight exposure to the plants.

18. A vertical growing system, comprising:
  a vertical post secured at its lower end;
  an uppermost multiple arm structure, comprising,
    a series of uppermost multiple arm structure arms that extend horizontally outward from the vertical post adjacent its top end, wherein each of the uppermost multiple arm structure arms comprises a gear attached to its distal end whose face is oriented perpendicular to the arm and which rotates in response to a driven rotation of the arm or a part thereof about its longitudinal axis;
  a lowermost multiple arm structure, comprising,
    a series of lowermost multiple arm structure arms that extend horizontally outward from the vertical post adjacent its lower end, wherein each of the lowermost multiple arm structure arms is aligned in the same vertical plane as a corresponding arm of the uppermost multiple arm structure, and wherein each of the arms of the lowermost multiple arm structure comprises a gear attached to its distal end whose face is oriented perpendicular to the arm and which rotates in response to a driven rotation of the arm or a part thereof about its longitudinal axis;
  a plurality of chains, wherein each chain connects and is rotated about the gears associated with a different set of vertically aligned arms of the uppermost and lowermost multiple arm structures;
  a plurality of motor assemblies, wherein each motor assembly is connected to a proximal end of a different one of the arms of the uppermost and lowermost multiple arm structures, and wherein each motor assembly drives the rotation of the arm it is connected to, and wherein the uppermost and lowermost multiple arm structure motor assemblies are synchronized with each other such that the gears associated with each set of vertically aligned arms of the uppermost and lowermost multiple arm structures rotate in the same rotational direction and at the same speed;
  a plurality plant support bar pairs connected to each of said plurality of chains, wherein each plant support bar of each pair of plant support bars extends horizontally from a different side of its associated chain at the same vertical height, with one plant support bar of each pair extending toward the vertical post and the other extending in the opposite direction away from the vertical post, and wherein each plant support bar is capable of supporting one or more plant hangers that each securely hold a plant; and a vertical growing system controller comprising one or more computing devices, and a vertical growing system control computer program having a plurality of sub-programs executable by said computing device or devices, wherein the sub-programs configure said computing device or devices to control the motor assemblies to rotate the gears on the uppermost and lowermost arms of the multiple arm structures to bring one or more plants to a particular vertical height.

19. The vertical growing system of claim 18, further comprising:

a watering system comprising watering arms that extend out from the vertical post, each of which comprises spray nozzles that spray water onto the plants held in plant hangers supported on the plant support bars in the vicinity of the watering arm; and wherein, the vertical growing system control computer program further comprises sub-programs that configure said computing device or devices to control the operation of the watering system to spray water onto the plants held in plant hangers supported on the plant support bars in the vicinity of the watering arm.

20. A vertical growing system, comprising:

a vertical post secured at its lower end;

an uppermost multiple arm structure, comprising, a series of uppermost multiple arm structure arms that extend horizontally outward from the vertical post adjacent its top end, wherein each of the uppermost multiple arm structure arms comprises a gear attached to its distal end whose face is oriented perpendicular to the arm and which rotates in response to a driven rotation of the arm or a part thereof about its longitudinal axis;

a lowermost multiple arm structure, comprising, a series of lowermost multiple arm structure arms that extend horizontally outward from the vertical post adjacent its lower end, wherein each of the lowermost multiple arm structure arms is aligned in the same vertical plane as a corresponding arm of the uppermost multiple arm structure, and wherein each of the arms of the lowermost multiple arm structure comprises a gear attached to its distal end whose face is oriented perpendicular to the arm and which rotates in response to a driven rotation of the arm or a part thereof about its longitudinal axis;

a plurality of chains, wherein each chain connects and is rotated about the gears associated with a different set of vertically aligned arms of the uppermost and lowermost multiple arm structures;

a plurality plant support bar pairs connected to each of said plurality of chains, wherein each plant support bar of each pair of plant support bars extends horizontally from a different side of its associated chain at the same vertical height, with one plant support bar of each pair extending toward the vertical post and the other extending in the opposite direction away from the vertical post;

one or more plant hangers that are removable hung from each plant support bar and which each securely hold a plant, and wherein each plant hanger takes the form of a small greenhouse that assists in controlling the environment for a plan held therein.

21. The vertical growing system of claim 20, wherein each plant hanger comprises one or more movable panels and an opening mechanism that opens the one or more movable panels to a degree that maintains an optimum temperature, humidity, and air flow for the plant held therein; and wherein the vertical growing system further comprises:

plant hanger sensors that measure the temperature, humidity, and air flow inside each plant hanger; and a vertical growing system controller comprising one or more computing devices, and a vertical growing system control computer program having a plurality of sub-programs executable by said computing device or devices, wherein the sub-programs configure said computing device or devices to, receive, from the plant hanger sensors, signals indicative of the temperature, humidity, and air flow inside each plant hanger, and control the opening mechanism of each plant hanger to create and maintain said optimum temperature, humidity, and air flow for the plant held therein.

22. A vertical growing system, comprising:

a vertical post secured at its lower end;

an uppermost multiple arm structure, comprising, a series of uppermost multiple arm structure arms that extend horizontally outward from the vertical post adjacent its top end, wherein each of the uppermost multiple arm structure arms comprises a gear attached to its distal end whose face is oriented perpendicular to the arm and which rotates in response to a driven rotation of the arm or a part thereof about its longitudinal axis;

a lowermost multiple arm structure, comprising, a series of lowermost multiple arm structure arms that extend horizontally outward from the vertical post adjacent its lower end, wherein each of the lowermost multiple arm structure arms is aligned in the same vertical plane as a corresponding arm of the uppermost multiple arm structure, and wherein each of the arms of the lowermost multiple arm structure comprises a gear attached to its distal end whose face is oriented perpendicular to the arm and which rotates in response to a driven rotation of the arm or a part thereof about its longitudinal axis;

a plurality of chains, wherein each chain connects and is rotated about the gears associated with a different set of vertically aligned arms of the uppermost and lowermost multiple arm structures; and a plurality support bar pairs connected to each of said plurality of chains, wherein each support bar of each pair of support bars extends horizontally from a different side of its associated chain at the same vertical height, with one support bar of each pair extending toward the vertical post and the other extending in the opposite direction away from the vertical post, and wherein each support bar is capable of supporting one or more growing structures for holding organisms being grown.

* * * * *